(No Model.)
W. ROBINSON.
Gate.
No. 231,617.
Patented Aug. 24, 1880.
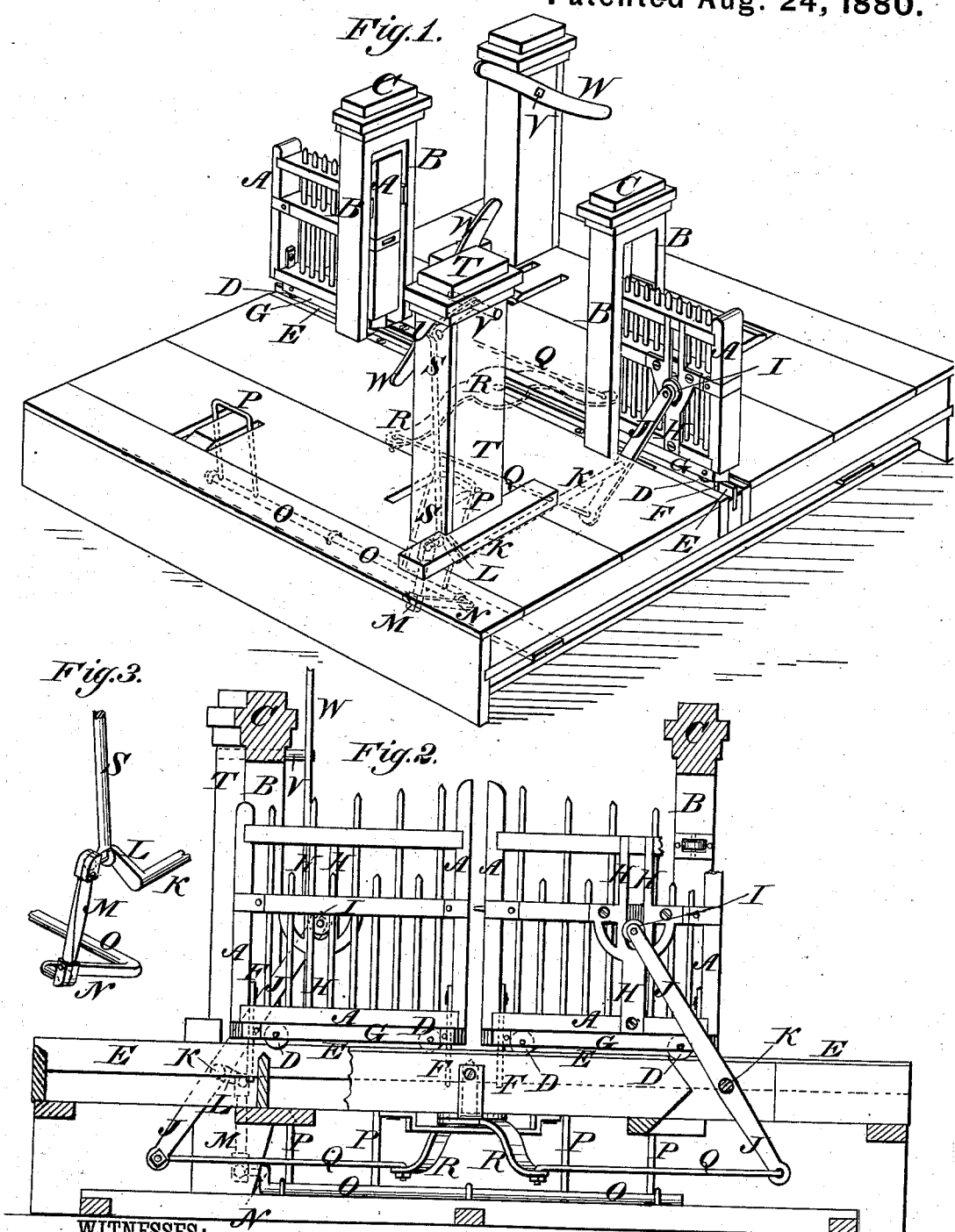
WITNESSES:
Denn P. Twitchell
C. Sedgwick
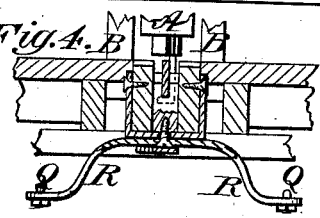
INVENTOR:
W. Robinson
BY Munn & Co.
ATTORNEYS.

UNITED STATES PATENT OFFICE.

WILLIAM ROBINSON, OF BODEGA, (SMITH'S RANCH P. O.,) CALIFORNIA.

GATE.

SPECIFICATION forming part of Letters Patent No. 231,617, dated August 24, 1880.

Application filed June 19, 1880. (No model.)

*To all whom it may concern:*

Be it known that I, WILLIAM ROBINSON, of Bodega, (Smith's Ranch P. O.,) in the county of Sonoma and State of California, have invented a new and useful Improvement in Gates, of which the following is a specification.

Figure 1 is a perspective view of the improvement. Fig. 2 is a sectional side elevation. Fig. 3 is a perspective view of a part of the mechanism for connecting the hand-levers and the wheel-iron rods with the gate. Fig. 4 is a sectional elevation of the mechanism for connecting the levers of the two parts of the gate.

Similar letters of reference indicate corresponding parts.

The object of this invention is to furnish approach-opening gates so constructed that they can be opened by the wheels of an approaching vehicle, by persons upon horseback or on foot, which will be operated by a positive movement, and which shall be simple in construction, strong, durable, and not liable to get out of order.

The invention consists in combining, with a gate having rollers and mounted upon a track, slotted bars, levers having rollers, rock-rods having cranks, connecting-rods having ball-and-socket joints, and rock-rods having cranks and wheel-irons for operating the gate by the wheels of a passing vehicle, the connecting-rods and the curved equal-armed bar for causing the parts of the gate to move together, and the connecting-rods and the shafts having crank-arms and levers for operating the gate from on horseback or on foot, whereby the gate can be opened and closed from any desired distance, as will be hereinafter fully described.

A represents the parts of the gate, which may be made of any desired style or size. Each part A of the gate moves forward and back between posts B, which are connected at their upper ends by a cross-bar, C. To the bases of the parts A of the gate are pivoted small flanged or grooved wheels or rollers D, which roll along a track, E, as the gate is opened and closed, and which are held down upon the said track by hook-rods F, attached to the parts of the gate and hooking upon the lower edge of the track E.

To the bases of the parts A of the gate are attached shoes G, the ends of which are made V-shaped, or have V-shaped cast-iron caps or blocks attached to them, to push off any rubbish that may lodge upon the track E, and thus keep the track clear. The track E is secured to timbers sunk in the ground in such a manner as to leave one side clear for the passage of the hook-rods F.

To the sides of the parts A of the gate are attached vertical plates or bars H, the upper parts of which are slotted longitudinally to receive the small rollers I, which revolve upon pins or bolts attached to the upper ends of the levers J, so that the parts A of the gate can be moved forward and back by the movements of the said levers J.

The levers J are rigidly attached a little below the surface of the ground to the inner ends of rods K, which extend in opposite directions and in line with the roadway to the points from which it is desired to operate the gate. To the outer ends of the rods K are rigidly attached short cranks L, which are connected by ball-and-socket joints with the upper ends of short connecting-rods M. The lower ends of the connecting-rods M are connected by ball-and-socket joints to cranks N, rigidly attached to the rods O, which work in bearings attached to timbers set in the ground. To each rod O are attached two loop-irons, P, which project upward at an angle with each other, so that one may be vertical when the other is pressed down. The loops P should project above the surface of the ground twelve inches, more or less, so that when struck by the wheels of a passing vehicle they will be moved far enough to open or close the gate. The loops or wheel-irons P may be formed by inserting the arms of a U-shaped bar in pipes rigidly attached to the rods O, and securing them in place by set-screws. This construction allows the wheel-irons to be conveniently adjusted when required and replaced when worn or broken.

Two wheel-irons, P, are attached to each rod O, and are arranged at the sides of the roadway in such a manner that the driver must guide the team to bring the off wheels of the vehicle against the off-wheel iron, the said wheel-irons being at such a distance apart that the near wheels of the vehicle will not interfere with the movement of the wheel-irons at the other side of the roadway.

The levers J project below the rods K, and to their ends are pivoted the ends of the connecting-rods Q, the other ends of which are pivoted to the ends of a bent or arched bar, R. The bar R is pivoted at its center to keepers or other suitable supports beneath the center of the gateway, so that the two parts A of the gate will always move together.

To the cranks L of the rods K are also pivoted the lower ends of the connecting-rods S, which pass up into the cavities of hollow posts T, set in the ground at the side of the off loops P as a vehicle approaches either side of the gate.

The upper ends of the connecting-rods S are pivoted to crank-arms U, attached to short shafts V, which work in bearings in the upper parts of the hollow posts T. To the inner ends of the shafts V are attached the middle parts of the upright levers W.

With this construction persons upon horseback can open and close the gate by taking hold of the upper ends of the levers W, and persons on foot can open and close the gate by taking hold of the lower ends of the said levers W.

Having thus fully described my invention, I claim as new and desire to secure by Letters Patent—

1. In an approach-opening gate, the combination, with the gate A, having rollers D and mounted upon a track, E, of the slotted bars H, the levers J, having rollers I, the rock-rods K, the cranks L, the connecting-rods M, having ball-and-socket joints, the cranks N, the rods O, and the wheel-irons P, substantially as herein shown and described, whereby the gate can be opened and shut by the wheels of a passing vehicle, as set forth.

2. In an approach-opening gate, the combination, with the gate having rollers D and mounted upon a track, E, the slotted bars H and the levers J, having rollers I, of the connecting-rods Q and the curved equal-armed bar R, substantially as herein shown and described, whereby both parts of the gate are made to move together, as set forth.

3. In an approach-opening gate, the combination, with the gate A, having rollers D and mounted upon a track, E, the slotted bars H, the levers J, having rollers I, the rock-rods K, and the cranks L, of the connecting-rods S, the shafts V, the cranks U, and the levers W, substantially as herein shown and described, whereby the gate can be opened by persons on horseback and on foot, as set forth.

WILLIAM ROBINSON.

Witnesses:
JOHN AYER,
WILL AUSTIN BAILEY.